United States Patent
Chen et al.

(10) Patent No.: US 10,495,459 B2
(45) Date of Patent: Dec. 3, 2019

(54) APPARATUS FOR PRODUCING 3D POINT-CLOUD MODEL OF PHYSICAL OBJECT AND PRODUCING METHOD THEREOF

(71) Applicants: XYZPRINTING, INC., New Taipei (TW); KINPO ELECTRONICS, INC., New Taipei (TW)

(72) Inventors: Wei-Fan Chen, New Taipei (TW); Waqar Shahid Qureshi, Islamabad (PK)

(73) Assignees: XYZPRINTING, INC., New Taipei (TW); KINPO ELECTRONICS, INC., New Taipei (TW)

(*) Notice: Subject to any disclaimer, the term of this patent is extended or adjusted under 35 U.S.C. 154(b) by 0 days.

(21) Appl. No.: 15/861,660

(22) Filed: Jan. 3, 2018

(65) Prior Publication Data
US 2019/0128670 A1     May 2, 2019

(30) Foreign Application Priority Data
Oct. 30, 2017  (CN) .......................... 2017 1 1033762

(51) Int. Cl.
*G06T 17/00*      (2006.01)
*G01C 11/02*      (2006.01)
(Continued)

(52) U.S. Cl.
CPC .......... *G01C 11/025* (2013.01); *G06T 7/337* (2017.01); *G06T 7/579* (2017.01); *G06T 17/00* (2013.01); *G06T 2207/10028* (2013.01)

(58) Field of Classification Search
CPC ......... G06T 17/20; G06T 19/00; G06T 17/00; G06T 17/10; G06T 17/005
(Continued)

(56) References Cited

U.S. PATENT DOCUMENTS

| | | | |
|---|---|---|---|
| 9,984,499 B1* | 5/2018 | Jurgenson | G06T 17/00 |
| 2003/0071194 A1* | 4/2003 | Mueller | G01B 11/00 250/208.1 |
| 2016/0100098 A1* | 4/2016 | Tada | H04N 5/23222 348/207.11 |

OTHER PUBLICATIONS

Evangelidis, G., Joint Alignment of Multiple Point Sets with Batch and Incremental Expectation-Maximization, Jun. 6, 2017, [Retrieved on Feb. 17, 2019], Retrieved from the internet: <URL: https://hal.inria.fr/hal-01413414/document (Year: 2017).*

* cited by examiner

*Primary Examiner* — Gordon G Liu
(74) *Attorney, Agent, or Firm* — Chun-Ming Shih; HDLS IPR Services (57) ABSTRACT

An apparatus for producing 3D point-cloud model of physical objects includes a rotatable platform (11), multiple patterns asymmetrically arranged on the rotatable platform (11), a background curtain (13), and an image capturing unit (12) arranged facing toward the background curtain (13). A producing method includes: placing an object (2) to be scanned on the rotatable platform (11); setting a capturing amount during one-time rotation operation; controlling the rotatable platform (11) to perform the rotation operation, and controlling the image capturing unit (12) to capture corresponding images during the rotation operation according to the capturing amount, wherein each image includes the entire object (2) and multiple of the patterns, and records corresponding global coordinates; and, performing matching on multiple features of each of the images, and constructing a 3D point-cloud model of the object (2) according to a matching result of the features and the global coordinates of each of the images.

15 Claims, 8 Drawing Sheets

(51) Int. Cl.
*G06T 7/579* (2017.01)
*G06T 7/33* (2017.01)

(58) Field of Classification Search
USPC .......................................................... 345/420
See application file for complete search history.

APPARATUS FOR PRODUCING 3D POINT-CLOUD MODEL OF PHYSICAL OBJECT AND PRODUCING METHOD THEREOF

BACKGROUND OF THE INVENTION

1. Field of the Invention

The technical field relates to a 3D point-cloud model of an object, and specifically relates to an apparatus for producing a 3D point-cloud models of a physical object, and a producing method for producing the 3D point-cloud model of the physical object.

2. Description of Related Art

According to the maturity of 3D printing technology, and the narrowed volume and reduced price of the 3D printers, the utilization of the 3D printers becomes popular these days.

General speaking, to print a physical 3D model, a user needs to first import a pre-established virtual 3D object into a 3D printer, thus the 3D printer can print out a physical 3D model which has the appearance, size, and color totally identical to that of the virtual 3D object through forming materials.

However, parts of the users are incapable of establishing the above virtual 3D object (i.e., do not have the ability to draw the virtual 3D object by using a 3D modeling software). These users can only download the virtual 3D objects from the Internet that were established and shared by the others, thus the willingness of purchasing and utilizing the 3D printer are then decreased.

According to the aforementioned problems, there's a demand in the market to introduce an apparatus and a method that can assist the users to easily establish a virtual 3D object to be printed.

SUMMARY OF THE INVENTION

The invention is directed to an apparatus and method for producing 3D point-cloud model of physical object, which may assist the users to easily re-build a 3D point-cloud model according to 2D images of a physical object.

In one of the exemplary embodiments of the present invention, the apparatus includes:

a rotatable platform, arranged to carry an object to be scanned;

multiple patterns, arranged asymmetrically on the rotatable platform;

a background curtain, arranged at one side of the rotatable platform;

an image capturing unit, arranged at other side of the rotatable platform against the background curtain and aiming at the background curtain; and a microprocessor, electrically connected with the rotatable platform and the image capturing unit, configured to set a capturing amount of the image capturing unit during one-time rotation operation of the rotatable platform;

wherein, the microprocessor is configured to receive a trigger action for controlling the rotatable platform to perform the rotation operation and controlling the image capturing unit to capture multiple images of the object according to the capturing amount during the rotation operation, wherein each of the images respectively records the entire object and the multiple patterns, and respectively records a set of global coordinates corresponding to different angle of view;

wherein, the microprocessor is configured to perform a matching action on multiple feature points of the object and the multiple patterns of each of the images, and re-builds a 3D point-cloud model of the object according to a matching result of the matching action and the sets of global coordinates of each of the images.

In another one of the exemplary embodiments of the present invention, the method is adopted by a producing apparatus having a rotatable platform, multiple patterns, a background curtain, an image capturing unit, and a microprocessor, wherein the rotatable platform is arranged to carry an object to be scanned, the multiple patterns are arranged asymmetrically on the rotatable platform, the background curtain is arranged at one side of the rotatable platform, the image capturing unit is arranged at other side of the rotatable platform against the background curtain and aiming at the background curtain, the microprocessor is electrically connected with the rotatable platform and the image capturing unit, and the method includes following steps:

a) setting a capturing amount of the image capturing unit during one-time rotation operation of the rotatable platform by the microprocessor;

b) receiving a trigger action by the microprocessor to control the rotatable platform to perform the rotation operation and to control the image capturing unit to capture multiple images of the object according to the capturing amount during the rotation operation, wherein each of the captured images respectively records the entire object and the multiple patterns, and respectively records a set of global coordinates corresponding to different angle of view; and c) performing a matching action on multiple feature points of the object and the multiple patterns of each of the images respectively by the microprocessor, and re-building a 3D point-cloud model of the object according to a matching result of the matching action and the sets of global coordinates of each of the images.

Each embodiment disclosed in the present invention may assist the user to re-build 3D points of a physical object for producing a 3D point-cloud model of the physical object according to 2D images of the physical object, therefore, the user may easily and quickly utilize the 3D point-cloud model for a modeling software to perform a modeling procedure of a virtual 3D object. Besides, in comparison with the related arts, the embodiments of the present invention may assist the user to precisely and effectively re-build the 3D point-cloud models for the physical objects that have high symmetry.

DETAILED DESCRIPTION OF THE INVENTION

In cooperation with the attached drawings, the technical contents and detailed description of the present invention are described thereinafter according to multiple embodiments, being not used to limit its executing scope. Any equivalent variation and modification made according to appended claims is all covered by the claims claimed by the present invention.

Figure 1:
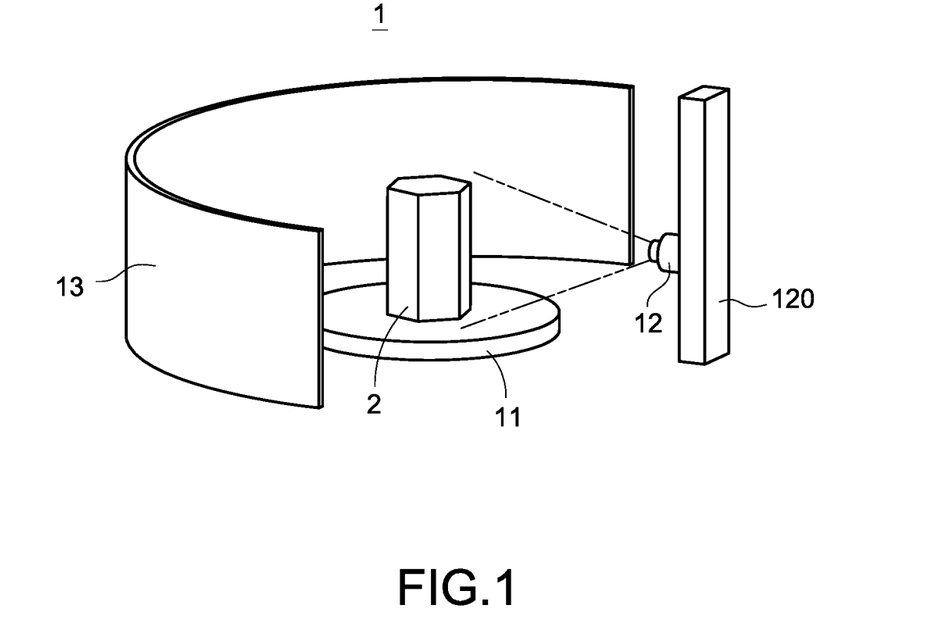
FIG. 1 is a schematic view of a producing apparatus according to a first embodiment of the present invention.
Figure 2:
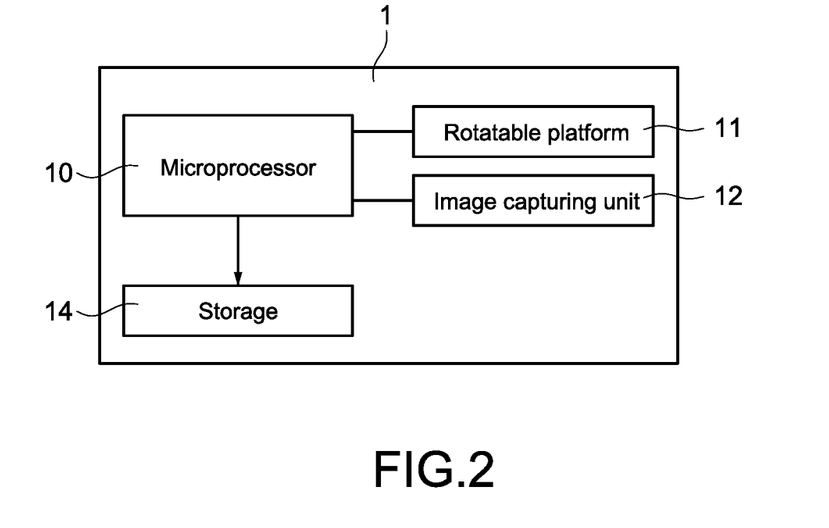
FIG. 2 is a block diagram of the producing apparatus according to the first embodiment of the present invention.

FIG. 1 is a schematic view of a producing apparatus according to a first embodiment of the present invention. FIG. 2 is a block diagram of the producing apparatus according to the first embodiment of the present invention. The exemplary embodiment of the present invention discloses a n apparatus for producing a 3D point-cloud model of a physical object (refers as the producing apparatus 1 hereinafter), in this embodiment, the producing apparatus 1 mainly includes a microprocessor 10, a rotatable platform 11, an image capturing unit 12, a background curtain 13, and a storage 14. In the embodiment, the image capturing unit 12 may be, for example, a camera.

Figure 7A:
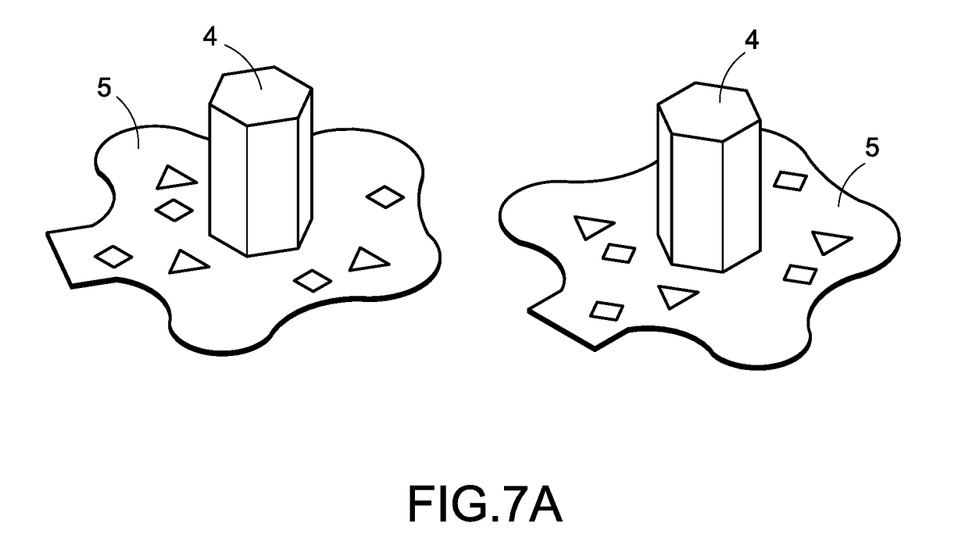
FIG. 7A is a schematic view showing a first image matching action according to other embodiment of the present invention.

As shown in FIG. 2, the microprocessor 10 is electrically connected with the rotatable platform 11, the image capturing unit 12, and the storage 14. The microprocessor 10 is configured to control the activities of the rotatable platform 11 and the image capturing unit 12, and also configured to store one or more 3D point-cloud models produced to the storage 14. In the exemplary embodiment of the invention, the producing apparatus 1 may also include a tablecloth (such as a tablecloth 5 shown in FIG. 5). The size of the tablecloth 5 is same as or similar to the size of the rotatable platform 11. The tablecloth 5 is arranged right on the rotatable platform 11, and multiple asymmetrical patterns are recorded on the tablecloth 5. In other embodiments, the multiple patterns may be separately arranged on the surface of the rotatable platform 11 directly in an asymmetrical way (for example, the multiple triangles and multiple squares as shown in FIG. 7A). If the multiple patterns are arranged, the tablecloth 5 may be omitted (detailed discussed in the following).

As shown in FIG. 1, the rotatable platform 11 is arranged for carrying an object 2 to be scanned for re-building a set of data of a 3D point-cloud. In particular, the object 2 to be scanned is a physical object. The producing apparatus 1 of the present invention may re-build 3D points of the physical object after scanning the physical object, thus the producing apparatus 1 may produce a 3D point-cloud model corresponding to the physical object (i.e., the produced 3D point-cloud model contains the set of data of the 3D point-cloud of the physical object). After the producing apparatus 1 imports the produced 3D point-cloud model to an external apparatus (for example, a computer installed with a 3D drawing software), the external apparatus may automatically perform a modeling procedure of a virtual 3D object according to the imported 3D point-cloud model. Therefore, even if the user is lack of the knowledge of the 3D drawing software, he or she can still produce and utilize the aforementioned virtual 3D object (e.g., imports the virtual 3D object to a 3D printer, so as to print a physical 3D model corresponding to the virtual 3D object).

The background curtain 13 is arranged at one side of the rotatable platform 11, and the measure of area of the background curtain 13 is at least larger than that of the object 2 to be scanned. In one embodiment, the background curtain 13 is a monochrome curtain. In other embodiment, the background curtain 13 is a pure white curtain.

The image capturing unit 12 is arranged at another side of the rotatable platform 11 against the background curtain 13, and the image capturing unit 12 is arranged to aim at the background curtain 13 for capturing images of the object 2 on the rotatable platform 11. In this embodiment, the images (which is a 2D image) captured by the image capturing unit 12 only contain the background curtain 13, the object 2 to be scanned, and the tablecloth 5 (or the multiple patterns) upon the rotatable platform 11. In other words, the measure of area of the background curtain 13 needs to be at least larger than the capturing scope of the image capturing unit 12.

In particular, the producing apparatus 1 further includes a holder 120. The holder 120 is arranged at another side of the rotatable platform 11 against the background curtain 13, and the image capturing unit 12 is arranged on the holder 120. In this embodiment, the user may adjust the height and the angle of the image capturing unit 12 upon the holder 120 due to the actual appearance of the object 2, the size of the object 2, and the required resolution of the producing apparatus 1, so as to improve the quality of scanning the object 2.

In the embodiments of the present invention, the background curtain 13, the holder 120, and the image capturing unit 12 are fixed during the scanning procedure, and the rotatable platform 11 may be controlled by the microprocessor 10 for rotating during the scanning procedure. In one embodiment, the rotatable platform 11 is controlled to execute a rotation operation, and the rotatable platform 11 may rotate 360 degrees (i.e., rotate a circle) in a constant speed during one-time rotation operation. In another embodiment, the rotatable platform 11 may apply a certain rotating speed for rotating a circle in 60 to 90 seconds to accomplish the rotation operation.

As mentioned above, according to the rotation of the rotatable platform 11, the image capturing unit 12 may capture multiple images of the object 2 to be scanned at different angles of views. In the present invention, the producing apparatus 1 analyzes the multiple captured images to re-build a set of data of a 3D point-cloud of the object 2 for producing a corresponding 3D point-cloud model, and may then perform a modeling procedure of a virtual 3D object corresponding to the object 2 based on the produced 3D point-cloud model. Specifically, the rotatable platform 11 may be arranged with the aforementioned tablecloth 5. While the rotatable platform 11 is rotating, the image capturing unit 12 may capture the images of the object 2 and also the tablecloth 5 from different angles of views. Therefore, if the object 2 to be scanned is an object having high symmetry, the microprocessor 10 may improve the analysis accuracy by capturing and analyzing the images of the tablecloth 5 (detailed discussed in the following).

Figure 3:
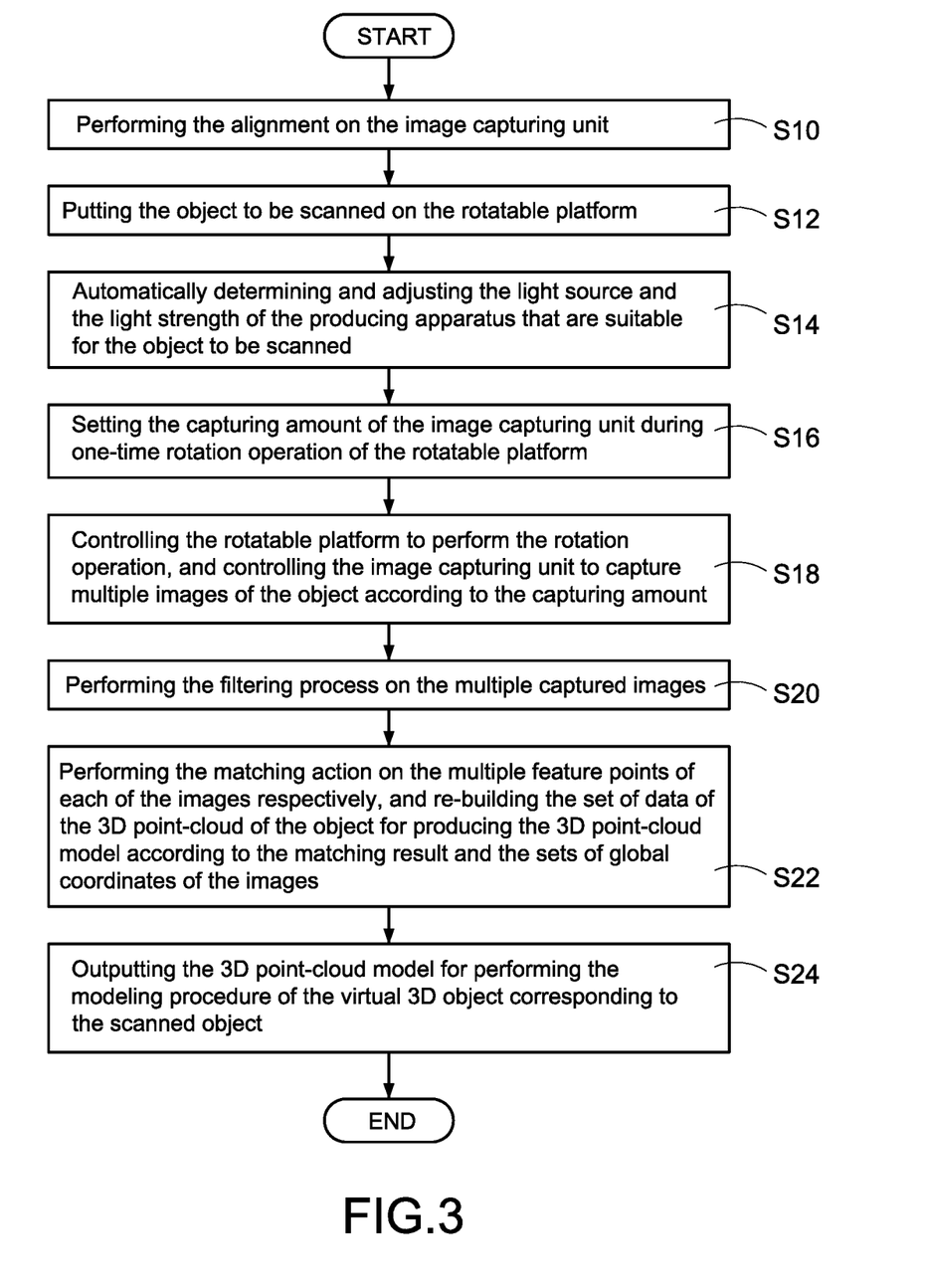
FIG. 3 is a producing flowchart according to the first embodiment of the present invention.

FIG. 3 is a producing flowchart according to the first embodiment of the present invention. The present invention also discloses a method for producing a 3D point-cloud model of a physical object (refers to as the producing method hereinafter). The producing method is mainly adopted by the producing apparatus 1 as shown in FIG. 1 and FIG. 2.

As shown in FIG. 3, before scanning, the producing apparatus 1 may first perform an alignment on the image capturing unit 12 (step S10). In particular, the producing apparatus 1 may use the microprocessor 10 to align the internal parameters (such as white balance, focal length, resolution, etc.) of the image capturing unit 12, and also aligns the relative positions between the image capturing unit 12 and the rotatable platform 11. There may be multiple possible embodiments of the aforementioned alignments which are common knowledge in the technical field, and thus are omitted here.

As mentioned, the producing apparatus 1 and the producing method of the present invention are analyzing the scanned 2D images of the object 2 for producing a corresponding 3D point-cloud model. In the present invention, the feature points that are retrieved from the 2D images by the producing apparatus 1 may be only pixel points of the object 2 to be scanned, the producing apparatus 1 may not directly obtain the actual size of the object 2 by retrieving the feature points. For obviating the above problem, after ensuring the relative positions between the image capturing unit 12 and the rotatable platform 11 at the step S10, the microprocessor 10 may calculate the actual size of the scanned object 2 during the analyzing process based on the relative positions, so as to make the produced 3D point-cloud model more precise.

Next, the user may put the object 2 to be scanned on the rotatable platform 11 (step S12). In particular, if a tablecloth 5 is arranged on the rotatable platform 11, the user in the step S12 is to put the object 2 on the tablecloth 5. In this embodiment, the rotatable platform 11 is a round platform, and the object 2 to be scanned is put on the center of the rotatable platform. Next, the microprocessor 10 automatically determines and adjusts light source and light strength of the producing apparatus 1 that are suitable for the object 2 to be scanned (step S14). In the embodiment, the microprocessor 10 may adjust the light source and the light strength according to the appearance, size, and color of the object 2 in company with the internal parameters of the image capturing unit 12 such as internal exposure, brightness, contrast, etc., so as to ensure that much more intensive feature points can be contained in the images captured by the image capturing unit 12, and also prevents the amount of the feature points from being insufficient due to the reflective phenomenon of the scanned object 2.

The microprocessor 10 may then set a capturing amount of the image capturing unit 12 during one-time rotation operation of the rotatable platform 11 (step S16), i.e., the total amount of the images that the image capturing unit 12 needs to capture during the period that the rotatable platform 11 rotates a circle in a constant speed.

After the object 2 is put and the capturing amount is set completely, the producing apparatus 1 may then receive an external trigger action, which triggers the microprocessor 10 to control the rotatable platform 11 to execute the rotation operation, and controls the image capturing unit 12 to capture multiple images of the object 2 to be scanned according to the set capturing amount (step S18). In one embodiment, each captured image respectively contains the entire object 2 therein, and each of the captured images respectively records a set of global coordinates corresponding to different angle of view of the object 2 relative to the image capturing unit 12.

If the rotatable platform 11 has the tablecloth 5 thereon, then each captured image may contain not only the entire object 2 but also the multiple patterns inside the tablecloth 5, wherein each captured image respectively records a set of global coordinates corresponding to different angle of view of the object 2 and the multiple patterns relative to the image capturing unit 12 (i.e., the object 2 and the multiple patterns in same image are deemed as a unity).

Figure 4:
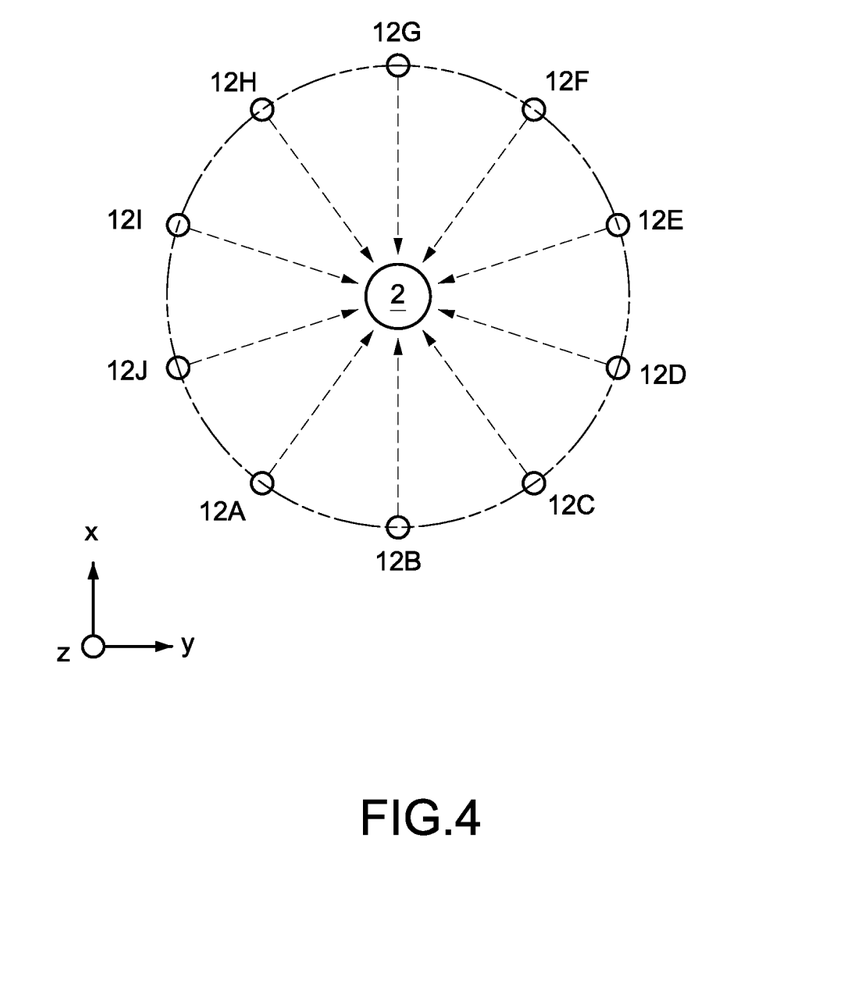
FIG. 4 is a schematic view of images capturing according to the first embodiment of the present invention.

FIG. 4 is a schematic view of images capturing according to the first embodiment of the present invention. As mentioned above, the rotatable platform 11 may rotate 360 degrees in a constant speed in one-time rotation operation, and the image capturing unit 12 may capture multiple images of the object 2 (and the multiple patterns) during the one-time rotation operation. In the present invention, the capturing intervals is the same for each captured image, but the content and the angle of view are different for each image. Therefore, the producing apparatus 1 may utilize the multiple captured images to constitute an effect that the image capturing unit 12 is rotating around the object 2 for scanning the appearance of the entire object 2.

In the embodiment as shown in FIG. 4, the capturing amount of the image capturing unit 12 is set as ten times, i.e., the image capturing unit 12 may capture ten images while the rotatable platform 11 rotates a circle, wherein each of the ten images is respectively recording a set of global coordinates corresponding to one angle of view of the object 2 (and the multiple patterns) relative to the image capturing unit 12.

The capturing amount is set as ten times in the embodiment, thus the image capturing unit 12 will capture one image that contains the entire object 2 (and the multiple patterns) every time the rotatable platform 11 rotates 36 degrees. If rotating a whole circle costs the rotatable platform 11 sixty seconds, the image capturing unit 12 will apply six seconds as the capturing intervals, and captures one image in every six seconds.

In the embodiment shown in FIG. 4, the ten captured images respectively record a first set of coordinates 12A, a second set of coordinates 12B, a third set of coordinates 12C, a fourth set of coordinates 12D, a fifth set of coordinates 12E, a sixth set of coordinates 12F, a seventh set of coordinates 12G, an eighth set of coordinates 12H, a ninth set of coordinates 12I, and a ten set of coordinates 12J, wherein each of the above sets of coordinates is a set of global coordinates, and each set of global coordinates respectively indicates the framing location of the image capturing unit 12 when capturing the image under a static status of the rotatable platform 11 (i.e., the ten images are respectively corresponding to ten different angles of views).

Refers to FIG. 3 again. After the step S18, the microprocessor 10 may optionally perform a filtering process on the multiple captured images (step S20), so as to filter one or multiple feature points that are not belonging to the scanned object 2 (and not belongs to the multiple patterns either).

More specific, the images of the object 2 captured by the image capturing unit 12 may contain some noises (for example, stains on the background curtain 13, or dirt on the camera of the image capturing unit 12). These noises may be misunderstood as the feature points of the object 2 or the multiple patterns by the microprocessor 10 and results in reducing the re-building quality. In this embodiment, the microprocessor 10 may optionally perform the step S20 to filter the worthless feature points from the captured images, so as to increase the capturing speed of the following feature points, and to improve the re-building quality of the set of data of the 3D point-cloud.

Next, the microprocessor 10 performs a matching action on the multiple feature points of each of the images respectively, and re-builds a set of data of a 3D point-cloud of the scanned object 2 according to the matching result and the sets of global coordinates of the images, and then produces the 3D point-cloud model based on the set of data of the 3D point-cloud (step S22). Finally, the producing apparatus 1 may outputs the 3D point-cloud model produced by the microprocessor 10 to an external apparatus (not shown), therefore the external apparatus may perform a modeling procedure of a virtual 3D object corresponding to the scanned object 2 according to the received 3D point-cloud model (step S24).

It should be mentioned that each of the images in this embodiment simultaneously contains the entire object 2 and the multiple patterns of the tablecloth 5, if the microprocessor 10 performs the matching action on the multiple feature points of each of the images respectively, the produced 3D point-cloud model will simultaneously contain a set of data of a 3D point-cloud of the scanned object 2 and also the multiple patterns. After the step S24, the user may further edit or delete parts of the virtual 3D object which correspond to the multiple patterns through a 3D modeling software, so as to only remain other parts of the virtual 3D object which correspond to the scanned object 2 for the following utilizing.

Figure 5:
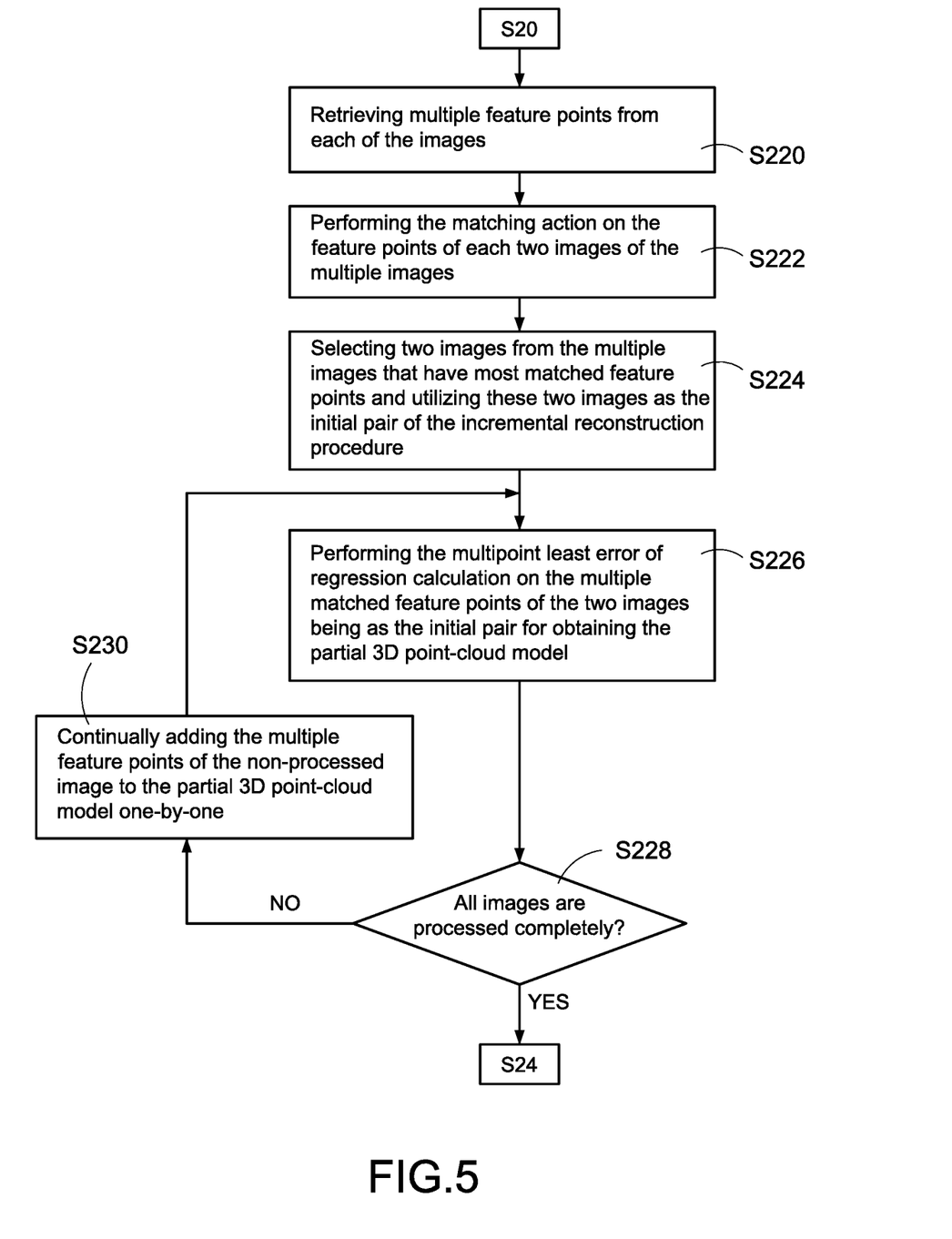
FIG. 5 is a matching flowchart according to the first embodiment of the present invention.

FIG. 5 is a matching flowchart according to the first embodiment of the present invention. FIG. 5 is used to further describe the step S22 in FIG. 3.

In particular, after receiving the multiple images captured by the image capturing unit 12, the microprocessor 10 may perform feature tracking actions respectively on each of the images, so as to retrieve multiple feature points from each of the images (step S220). The aforementioned feature points may include multiple feature points corresponding to the scanned object 2 of the image and also multiple feature points corresponding to the multiple patterns of the image. However, the feature tracking action is only a common technical solution in image recognition field, which is omitted here.

Next, the microprocessor 10 performs the matching action on the feature points of each two images of the multiple images (step S222), and selects two images from the multiple images that have most matched feature points, and utilizes these two images as an initial pair of an incremental reconstruction procedure of the scanned object 2 (step S224).

For example, if the microprocessor 10 obtains ten images from the image capturing unit 12, the microprocessor 10 will perform the matching action for forty-five times in the step S222 (i.e., perform the matching action on a first image and a second image, perform the matching action on the first image and a third image, perform the matching action on the first image and a fourth image, and so on).

In another embodiment, the microprocessor 10 may perform the matching action only on each two adjacent images of the multiple images (i.e., perform the matching action on a first image and a second image, perform the matching action on the second image and a third image, perform the matching action on the third image and a fourth image, and so on), so as to reduce the executing time of the matching action.

In the step S222, the microprocessor 10 may determine whether the feature points in each of the images are indicating the same or similar feature of the object 2 or not according to image recognition technologies, and regards the feature points that indicate the same or similar feature as the matched feature points. In the step S224, the microprocessor 10 uses the two images that have the most matched feature points (i.e., the two images that are determined having most same or similar features) as the above initial pair, and starts the incremental reconstruction procedure based on the initial pair of images.

After the step S224, the microprocessor 10 performs a multipoint least error of regression calculation on the multiple matched feature points of the two images being as the initial pair, so as to obtain a partial 3D point-cloud model (step S226), wherein the partial 3D point-cloud model is recorded with a plurality of data of a 3D point-cloud within a tolerance scope.

More specific, the two images regarded as the initial pair are respectively corresponding to two different angles of views, so the matched feature points in the two images may have a special distance of several pixels. In the step S226, the microprocessor 10 performs the multipoint least error of regression calculation on the multiple matched feature points of the two images, so as to delete one or more of the matched feature points that have the error exceeds the tolerance scope, and only remains one or more of the matched feature points that have the error smaller than the tolerance scope for being used to re-build parts of data of the 3D point-cloud, and then produces the partial 3D point-cloud model according to the parts of data of the 3D point-cloud.

As discussed above, the microprocessor 10 only matches two images in the step S226 (i.e., only consider two angles of views of the scanned object 2), the produced 3D point-cloud model (which is the partial 3D point-cloud model) is lack of data of the 3D point-cloud corresponding to other angles of views, that is, the microprocessor 10 only produce the partial 3D point-cloud model in the step S226, but not produce a complete 3D point-cloud model.

After the step S226, the microprocessor 10 determines whether all images are processed completely (step S228). If there's still a non-processed image, the microprocessor 10 continually adds the multiple feature points of the non-processed image(s) to the partial 3D point-cloud model one-by-one (step S230), and again executes the step S226 for adjusting the existed data of the 3D point-cloud of the partial 3D point-cloud model, and adds new feature points to the partial 3D point-cloud model for increasing the amount of data of the 3D point-cloud.

If all the images captured by the image capturing unit 12 are processed completely, the microprocessor 10 has already considered all the angles of views of the scanned object 2 (and the multiple patterns) during the producing procedure of the 3D point-cloud model, so the microprocessor 10 may then transform the partial 3D point-cloud model into a complete 3D point-cloud model. In the step S24 of FIG. 3, the microprocessor 10 is to output the complete 3D point-cloud model produced in the step S226.

In particular, the producing apparatus 1 of the present invention may optionally save all the images captured by the image capturing unit 12, the multiple feature points retrieved by the microprocessor 10, and the partial 3D point-cloud model and the complete 3D point-cloud model produced by the microprocessor unit 10 in the storage 14. Therefore, a user may perform a modeling procedure of a virtual 3D object corresponding to the scanned object 2 (and the multiple patterns) directly based on the aforementioned data saved in the storage 14.

In one embodiment, the microprocessor 10 may simultaneously use additional data (such as the relative positions between the image capturing unit 12 and the rotatable platform 11, the capturing intervals of the images, etc.) as input parameters of the multipoint least error of regression calculation, therefore the produced 3D point-cloud model will be more relative to the actual size of the scanned object 2.

Next, the tablecloth 5 arranged on the rotatable platform 11 will be discussed in the following.

Specifically, if the volume of the scanned object 2 is too small, the amount of the feature points retrieved from the images may be insufficient, therefore the set of data of the 3D point-cloud re-built by the microprocessor 10 may be erroneous.

Besides, if the object 2 to be scanned has high symmetry, then two or more of the captured images (respectively corresponding to different angles of views) may contain extremely similar contents and causes the microprocessor 10 to relate different images to the same angle of view. Therefore, the 3D point-cloud model produced by the microprocessor 10 will be erroneous.

Figure 6A:
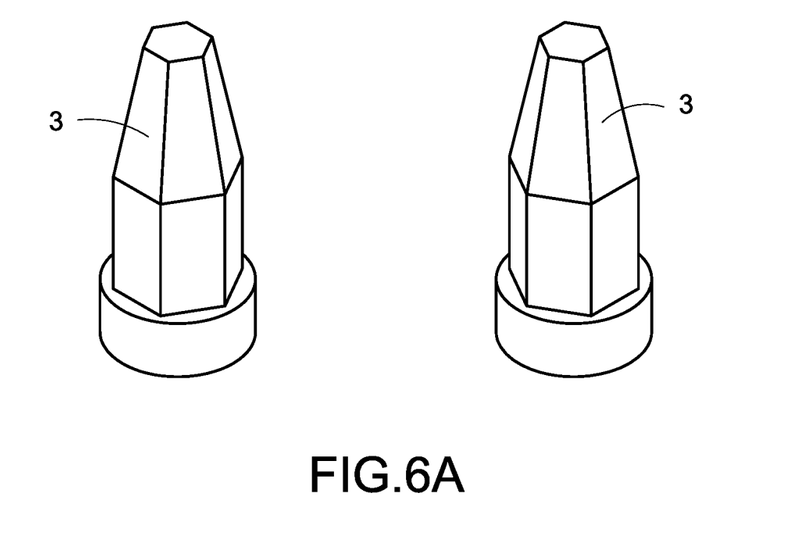
FIG. 6A is a schematic view showing a first image matching action according to one embodiment of the present invention.
Figure 6B:
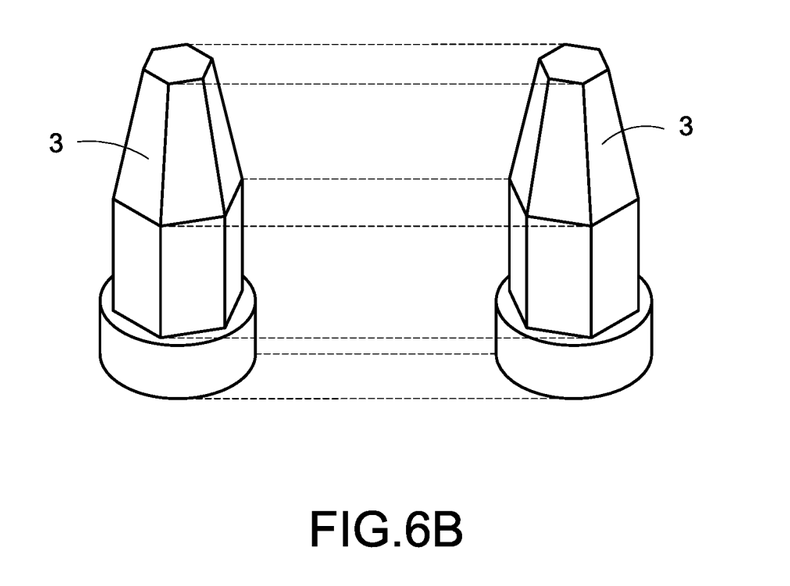
FIG. 6B is a schematic view showing a second image matching action according to the one embodiment of the present invention.

FIG. 6A is a schematic view showing a first image matching action according to one embodiment of the present invention. FIG. 6B is a schematic view showing a second image matching action according to the one embodiment of the present invention. FIG. 6A discloses a first angle of view of an object 3 and FIG. 6B discloses a second angle of view of the object 3. As shown, the object 3 in FIG. 6A and FIG. 6B does have high symmetry. After retrieving multiple feature points of the object 3 from the multiple images (each image corresponds to different angle of view), the microprocessor 10 may erroneously connect different feature points to same feature of the object 3 (for example, erroneously identifies a first sharp-angle of the object 3 and a fourth sharp-angle of the object 3 as an identical feature), and then erroneously relates two or more images to the same angle of view of the object 3.

For obviating the above problem, the rotatable platform 11 in the exemplary embodiments of the present invention is arranged with the aforementioned tablecloth 5. The tablecloth 5 is recorded with multiple asymmetric patterns thereon, which may ensure the contents and the angles of views of the multiple images captured by the image capturing unit 12 are totally different from each other. It should be noted that the tablecloth 5 may be a flat tablecloth (i.e., contains multiple flat patterns) or a three-dimensional tablecloth (i.e., contains multiple three-dimensional patterns), not limited thereto.

In another embodiment, a user of the producing apparatus 1 may arrange multiple patterns (such as multiple objects or multiple pictures) directly on the surface of the rotatable platform 11 in an asymmetric way. The multiple separately arranged patterns (such as the multiple triangles and squares shown in FIG. 7A) may assist the microprocessor 10 in indicating the angles of views of the object 3, so as to achieve the purpose of increasing the asymmetry among each angle of view of the images. Therefore, the present invention is not restricted in arranging the single tablecloth 5.

For the sake of describing, the embodiment with a single tablecloth is taken for an example in the following.

Figure 7B:
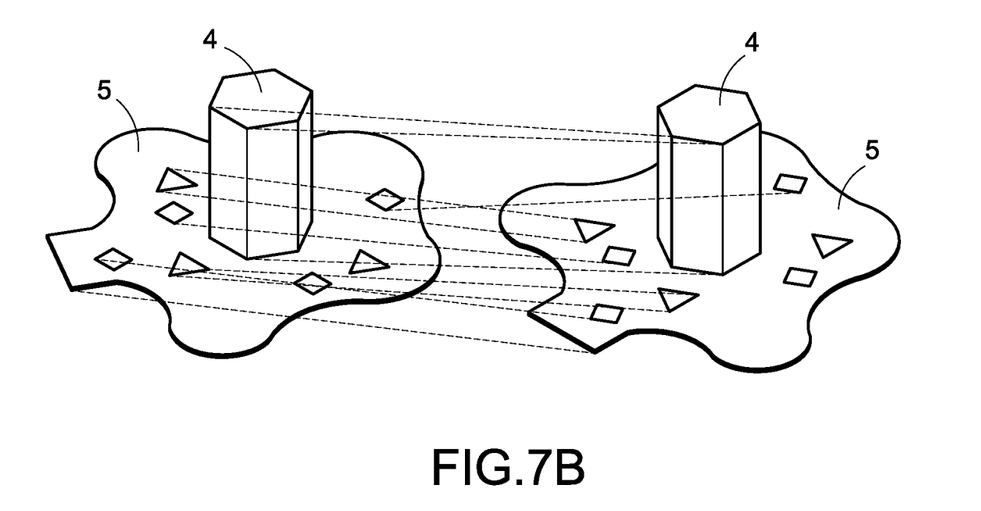
FIG. 7B is a schematic view showing a second image matching action according to the other embodiment of the present invention.

Refers to FIG. 7A and FIG. 7B, wherein FIG. 7A is a schematic view showing a first image matching action according to other embodiment of the present invention, and FIG. 7B is a schematic view showing a second image matching action according to the other embodiment of the present invention. As shown in FIG. 7A and FIG. 7B, the producing apparatus 1 may be arranged with a tablecloth 5 having multiple asymmetric patterns on the surface of the rotatable platform 11, and arranged an object 4 to be scanned upon the tablecloth 5. In particular, an asymmetric pattern means that any angle of view of the pattern is different from any other angles of views of the pattern. In one embodiment, the patterns on the tablecloth 5 may be deemed as the asymmetric patterns as long as any one angle of view of the patterns is different from other angles of views of the patterns.

If the producing apparatus 1 has the aforementioned tablecloth 5, every image captured by the image capturing unit 12 in the step S18 of FIG. 3 may respectively contain the entire object 4 and the multiple patterns of the tablecloth 5. In this embodiment, every image has the content and the angle of view which are different from that of other images, wherein the different part may come from the scanned object 4 or the multiple patterns of the tablecloth 5.

The images with different contents and different angles of views may be represented through the following formula:

$$\vec{F}_i \times \vec{F}_j \neq 0 \text{ for any image views i,j, but } i \neq j$$

In the above formula, $\vec{F}_i$ indicates a feature points multi-dimensional vector of an image corresponding to iTH angle of view obtained by utilizing an image describer method, $F_j$ indicates a feature points multi-dimensional vector of an image corresponding to jTH angle of view obtained by utilizing the image describer method. If the exterior product of the two feature points multi-dimensional vectors of the two images does not exist a zero vector, means that these two images (i.e., the two angles of views) appear no similarity, which may be deemed as asymmetric.

In particular, when executing the step S22 of FIG. 3, the microprocessor 10 is to simultaneously retrieve multiple feature points of the scanned object 4 and multiple feature points of the multiple patterns inside the tablecloth 5 from each of the images, and then performs the matching action on these feature points of the images. Therefore, the present invention may use the tablecloth 5 to solve the problem that the volume of the object 4 is too small to provide enough feature points, and also solves the problem that the appearance of the object 4 is highly symmetric and causes the microprocessor 10 in misjudging the angles of views of the images.

FIG. 7A and FIG. 7B respectively disclose different angles of views of an object 4 to be scanned. The object 4 shown in the Figs has high symmetry, which the microprocessor 10 may misjudge the coordinates of parts of the feature points of two matched images of the object 4. In this embodiment, the two matched images respectively contain the aforementioned tablecloth 5, so the microprocessor 10 may simultaneously retrieve the multiple feature points of the multiple patterns inside the tablecloth 5 and perform the matching action based on these feature points as well. Therefore, the microprocessor 10 may precisely relate each feature point of each of the images to the exact feature of the scanned object 4 or the patterns, so as to correctly identify the angle of view of each image and then re-builds a correct set of data of the 3D point-cloud.

As mentioned, arranging the tablecloth 5 on the rotatable platform 11 may solve the problem that the scanned object 2, 3, or 4 is too small to provide enough feature points, and may also solve the problem that the scanned object 2, 3, or 4 has high symmetry and is hard to identify the actual coordinates of the 3D points corresponding to each of the feature points, so as to increase the accuracy of the microprocessor 10 in producing the 3D point-cloud model.

In the above embodiments, the producing apparatus 1 is only arranged with one image capturing unit 12. Since the rotatable platform 11 can only rotate along a vertical axis (such as a Z axis shown in FIG. 4), the image capturing unit 12 may not be able to capture the top image of the object 2, 3, or 4, or the image of the concave parts of the object 2, 3, or 4 (i.e., the captured images may have blind spots). Therefore, the 3D point-cloud model produced by the microprocessor 10 will be lack of the data of the 3D point-cloud corresponding to these blind spots.

Figure 8:
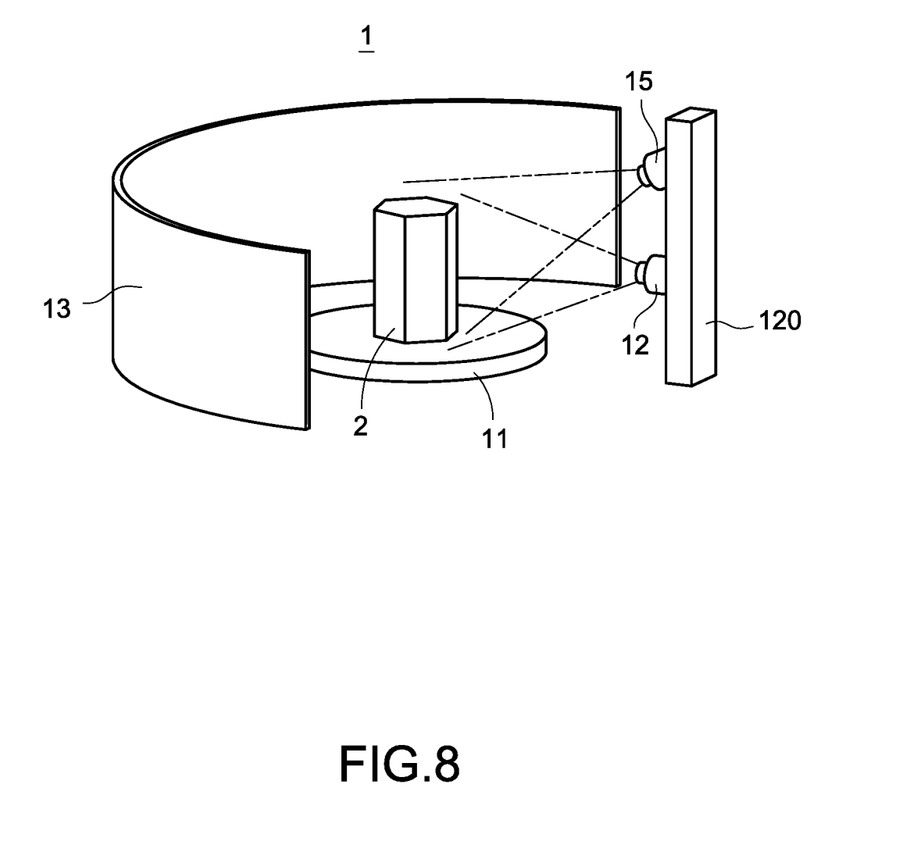
FIG. 8 is a schematic view of a producing apparatus according to a second embodiment of the present invention.

FIG. 8 is a schematic view of a producing apparatus according to a second embodiment of the present invention. The producing apparatus 1 disclosed in FIG. 8 further includes a second image capturing unit 15. The second image capturing unit 15 is electrically connected with the microprocessor 10, and is arranged aiming at the background curtain 13.

In one embodiment, the second image capturing unit 15 is arranged on the holder 120 in company with the image capturing unit 12, and the height and angle of the second image capturing unit 15 are different from that of the image capturing unit 12. Besides, the microprocessor 10 may set same capturing amount for both the image capturing unit 12 and the second image capturing unit 15 in the step S16 of FIG. 3. In other words, if the image capturing unit 12 needs to capture ten images during one-time rotation operation of the rotatable platform 11, the second image capturing unit 15 needs to capture ten images as well.

In this embodiment, the second image capturing unit 15 has different height and angle in comparison with the image capturing unit 12, so the producing apparatus 1 needs to perform an alignment on the image capturing unit 12 and the second image capturing unit 15 before scanning, so as to confirm the relative positions between the image capturing unit 12 and the second image capturing unit 15. After the image capturing unit 12 and the second image capturing unit 15 are respectively capturing multiple images, the microprocessor 10 may re-build a set of data of the 3D point-cloud of the scanned object 2 based on the multiple feature points of the multiple captured images, and also the relative positions among the image capturing unit 12, the second image capturing unit 15, and the rotatable platform 11.

Figure 9:
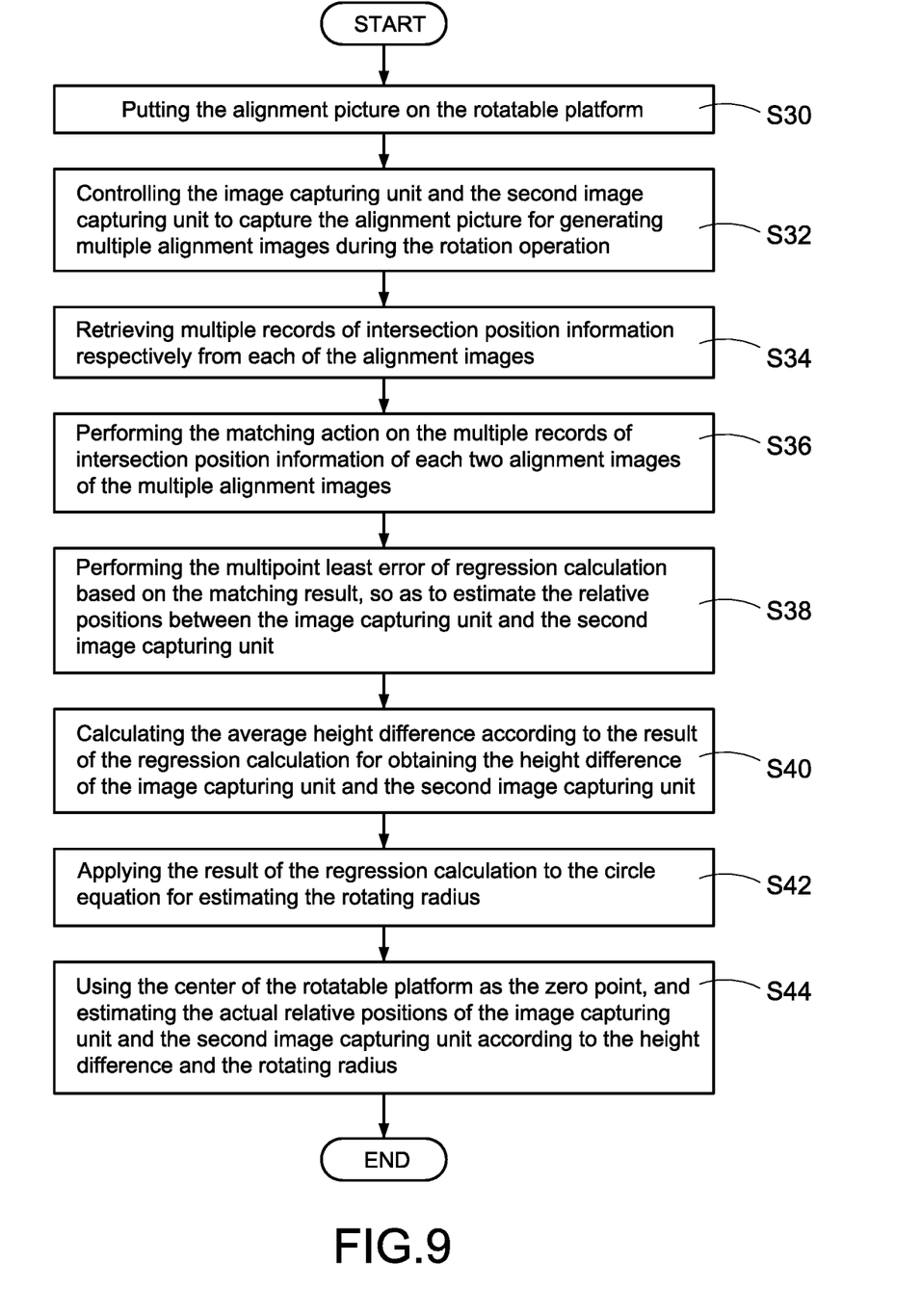
FIG. 9 is a flowchart for alignment of image capturing units according to the first embodiment of the present invention.

FIG. 9 is a flowchart for alignment of image capturing units according to the first embodiment of the present invention. First, a user of the producing apparatus 1 may put an alignment picture on the surface of the rotatable platform 11 (step S30). In one embodiment, the alignment picture may be a checkerboard graphic having multiple intersections thereon, but not limited thereto.

Next, the microprocessor 10 may receive an external trigger, so as to control the rotatable platform 11 to perform the aforementioned rotation operation, and to control the image capturing unit 12 and the second image capturing unit 15 to capture the alignment picture for generating multiple alignment images during the rotation operation (step S32), wherein each of the alignment images respectively contains the entire alignment picture.

After the step S32, the microprocessor 10 may retrieve multiple records of intersection position information respectively from each of the alignment images (step S34), and performs a matching action on the multiple records of intersection position information of each two alignment images of the multiple alignment images (step S36). The matching action in the step S36 is identical or similar to the matching action discussed in the step S222 of FIG. 5, which is omitted here.

After the step S36, the microprocessor 10 may perform the multipoint least error of regression calculation based on a matching result of the matching action, so as to estimate the relative positions between the image capturing unit 12 and the second image capturing unit 15 (step S38).

In particular, the microprocessor 10 may obtain two elevations after executing the regression calculation, so it may then calculate an average height difference according to the result of the regression calculation for obtaining a height difference of the image capturing unit 12 and the second image capturing unit 15 (step S40). Besides, the microprocessor 10 may also apply the result of the regression calculation to a circle equation for estimating a rotating radius (step S42). Eventually, the microprocessor 10 may use a center of the rotatable platform 11 as a zero point, and then estimates the actual relative positions of the image capturing unit 12 and the second image capturing unit 15 on the producing apparatus 1 according to the height difference and the rotating radius (step S44).

By utilizing the producing apparatus 1 and the producing method of the present invention, a user may easily obtain a 3D point-cloud model corresponding to a physical object, so as to re-build a virtual 3D object corresponding to the physical object very quick based on the 3D point-cloud model. Therefore, the user may use computer software to further edit the virtual 3D object, or imports the virtual 3D object to a 3D printer for printing a physical 3D model corresponding to the virtual 3D object, which is very convenient.

Besides, the arrangement of the tablecloth 5 in the present invention may solve the problem that the volume of a physical object is too small to provide enough feature points, and may also solve the problem that the appearance of the physical object has high symmetry and is hard to be scanned and identified precisely by the producing apparatus 1, which improves the accuracy of the 3D point-cloud model produced by the producing apparatus 1.

Furthermore, the arrangement of the multiple image capturing units 12 and 15 may take care of the blind spots existed when only utilizing one image capturing unit to scan, and thus prevent the produced 3D point-cloud model from being erroneous.

As the skilled person will appreciate, various changes and modifications can be made to the described embodiment. It is intended to include all such variations, modifications and equivalents which fall within the scope of the present invention, as defined in the accompanying claims.

What is claimed is:

1. An apparatus (1) for producing 3D point-cloud model of physical object, comprising:
   a rotatable platform (11), arranged to carry an object (2) to be scanned;
   multiple patterns, arranged on the rotatable platform (11), wherein the multiple patterns are asymmetric patterns or being arranged on the rotatable platform in an asymmetric way;
   a background curtain (13), arranged at one side of the rotatable platform (11);
   an image capturing unit (12), arranged at other side of the rotatable platform (11) against the background curtain (13) and aiming at the background curtain (13); and
   a microprocessor (10), electrically connected with the rotatable platform (11) and the image capturing unit (12), configured to set a capturing amount of the image capturing unit (12) during a one-time rotation operation of the rotatable platform (11);

wherein, the microprocessor (10) is configured to receive a trigger action for controlling the rotatable platform (11) to perform the one-time rotation operation and controlling the image capturing unit (12) to capture multiple images of the object (2) according to the capturing amount during the rotation operation, wherein each of the multiple images respectively records the entire object (2) and part of the multiple patterns, and respectively records a set of global coordinates corresponding to different angle of view, wherein each of the multiple images respectively has a content and an angle of view different from other images of the multiple images and the different part comes from the object (2) or part of the multiple patterns;

wherein, the microprocessor (10) is configured to perform a matching action on multiple feature points of the object (2) and the multiple patterns of each of the multiple images, and re-builds a 3D point-cloud model of the object (2) according to a matching result of the matching action and the sets of global coordinates of each of the multiple images, and the re-built 3D point-cloud model contains at least a set of data of 3D point-cloud of the object (2) and another set of data of 3D point-cloud of the multiple patterns.

2. The apparatus (1) in claim 1, further comprising a tablecloth (5) arranged on a surface of the rotatable platform (11), wherein the tablecloth (5) is recorded with the multiple patterns thereon.

3. The apparatus (1) in claim 1, wherein the rotation operation is to rotate 360 degrees in a constant speed, the multiple images have same capturing intervals, and the multiple images respectively have different contents and different angles of views.

4. The apparatus (1) in claim 1, further comprising a storage (14), electrically connected with the microprocessor (10), wherein the storage (10) is configured to record the multiple images, the multiple feature points, and the 3D point-cloud model.

5. The apparatus (1) in claim 1, wherein the microprocessor (10) is configured to retrieve the multiple feature points from each of the images, to perform the matching action on the multiple feature points of each two images of the multiple images, and to select two images of the multiple images having most matched feature points as an initial pair of an incremental reconstruction procedure.

6. The apparatus (1) in claim 5, wherein the microprocessor (10) is configured to perform a multipoint least error of regression calculation on the matched feature points of the two images being the initial pair for obtaining a partial 3D point-cloud model, wherein the partial 3D point-cloud model is configured to record a plurality of data of a 3D point-cloud within a tolerance scope, and the microprocessor (10) is configured to continually add multiple feature points of a non-processed image of the multiple images to the partial 3D point-cloud model one-by-one, and to continually perform the multipoint least error of regression calculation to adjust and increase the data of the 3D point-cloud of the partial 3D point-cloud model, so as to obtain a complete 3D point-cloud model.

7. The apparatus (1) in claim 1, further comprising a second image capturing unit (15), electrically connected with the microprocessor (10) and arranged aiming at the background curtain (13), wherein the second image capturing unit (15) is arranged with a height and an angle different from that of the image capturing unit (12), and the second image capturing unit (15) is set with the capturing amount same as the image capturing unit (12).

8. A method for producing 3D point-cloud model of physical object, adopted by a producing apparatus (1) having a rotatable platform (11), multiple patterns, a background curtain (13), an image capturing unit (12), and a microprocessor (10), the rotatable platform (11) arranged to carry an object (2) to be scanned, the multiple patterns arranged on the rotatable platform (11), the background curtain (13) arranged at one side of the rotatable platform (11), the image capturing unit (12) arranged at other side of the rotatable platform (11) against the background curtain (13) and aiming at the background curtain (13), the microprocessor (10) electrically connected with the rotatable platform (11) and the image capturing unit (12), and the method comprising:

a) setting a capturing amount of the image capturing unit (12) during a one-time rotation operation of the rotatable platform (11) by the microprocessor (10);

b) receiving a trigger action by the microprocessor (10) to control the rotatable platform (11) to perform the one-time rotation operation and to control the image capturing unit (12) to capture multiple images of the object (2) according to the capturing amount during the rotation operation, wherein each of the multiple images respectively records the entire object (2) and part of the multiple patterns, and respectively records a set of global coordinates corresponding to different angle of view, wherein the multiple patterns are asymmetric patterns or being arranged on the rotatable platform in an asymmetric way, each of the multiple images respectively has a content and an angle of view different from other images of the multiple images and the different part comes from the object (2) or part of the multiple patterns; and c) performing a matching action on multiple feature points of the object (2) and the multiple patterns of each of the multiple images respectively by the microprocessor (10), and re-building a 3D point-cloud model of the object (2) according to a matching result of the matching action and the sets of global coordinates of each of the multiple images, wherein the 3D point-cloud model contains at least a set of data of 3D point-cloud of the object (2) and another set of data of 3D point-cloud of the multiple patterns.

9. The method in claim 8, wherein the producing apparatus (1) further comprises a tablecloth (5) arranged on a surface of the rotatable platform (11), and the tablecloth (5) is recorded with the multiple patterns thereon.

10. The method in claim 8, wherein the step b) is to control the rotatable platform (11) to rotate 360 degrees in a constant speed, and to control the image capturing unit (12) to capture the multiple images according to same capturing intervals, wherein the multiple images respectively have different contents and different angles of views.

11. The method in claim 8, wherein the step c) comprises following steps:

c1) retrieving the multiple feature points of each of the multiple images respectively;

c2) performing the matching action on the multiple feature points of each two images of the multiple images;

c3) selecting two images of the multiple images that have most matched feature points as an initial pair of an incremental reconstruction procedure after step c2);

c4) executing a multipoint least error of regression calculation on the multiple matched feature points of the two images being the initial pair for obtaining a partial 3D point-cloud model, wherein the partial 3D point-cloud model is configured to record a plurality of data of a 3D point-cloud within a tolerance scope;

c5) determining whether the multiple images are all processed completely; and c6) before the multiple images are all processed completely, continually adding the multiple feature points of a non-processed image of the multiple images to the partial 3D point-cloud model one-by-one, and re-executing step c4) to adjust and increase the data of the 3D point-cloud of the partial 3D point-cloud model, so as to obtain a complete 3D point-cloud model.

12. The method in claim 8, further comprising a step a0) before step a): automatically determining and adjusting a light source and a light strength of the producing apparatus (1) suitable for the object (2) to be scanned.

13. The method in claim 8, further comprising a step c0) before step c): performing a filtering process on each of the multiple images for deleting one or more feature points that are not belonging to the object (2) and the multiple patterns from each of the images.

14. The method in claim 8, further comprising a step d): outputting the 3D point-cloud model for executing a modeling procedure of a virtual 3D object corresponding to the object (2).

15. The method in claim 8, wherein the producing apparatus (1) further comprises a second image capturing unit (15), electrically connected with the microprocessor (10) and arranged aiming at the background curtain (13), wherein the second image capturing unit (15) is arranged with a height and an angle different from that of the image capturing unit (12), and the second image capturing unit (15) is set with the capturing amount same as the image capturing unit (12), and the method further comprises following steps before step a):

a1) controlling the rotatable platform (11) to perform the rotation operation and controlling the image capturing unit (12) and the second image capturing unit (15) to capture an alignment picture on the rotatable platform (11) for generating multiple alignment images during the rotation operation, wherein each of the multiple alignment images respectively contains the entire alignment picture;

a2) retrieving multiple records of intersection position information of each of the multiple alignment images respectively;

a3) performing a matching action on the multiple records of intersection position information of each two alignment images of the multiple alignment images;

a4) performing a regression calculation according to a matching result of the matching action for estimating relative positions between the image capturing unit (12) and the second image capturing unit (15);

a5) calculating an average height difference according to a result of the regression calculation for obtaining a height difference of the image capturing unit (12) and the second image capturing unit (15);

a6) applying the result of the regression calculation to a circle equation for estimating a rotating radius; and a7) utilizing a center of the rotatable platform (11) as a zero point and estimating actual relative positions of the image capturing unit (12) and the second image capturing unit (15) according to the height difference and the rotating radius.

\* \* \* \* \*